United States Patent Office 3,337,591
Patented Aug. 22, 1967

3,337,591
6β,17β-SUBSTITUTED CYCLOANDROSTANES
Leslie A. Freiberg, Waukegan, and John Wayne Cole, Deerfield, Ill., assignors to Abbott Laboratories, Chicago, Ill., a corporation of Illinois
No Drawing. Filed Mar. 29, 1965, Ser. No. 443,675
7 Claims. (Cl. 260—397.1)

The present invention is directed to new steroids. More particularly, the present invention is concerned with the manufacture of 6β-amino-17β-carboxy-3α,5α-cycloandrostanes and the loweralkyl esters thereof.

The new compounds are members of the class represented by the formula

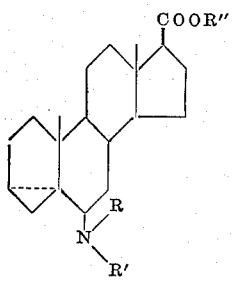

wherein each R, R′ and R″ is loweralkyl or hydrogen. R′ may further be a lower fatty acid acyl group. Representative examples of the new class of steroids falling within the above definition are the 6β-dimethylamino-17β-carbomethoxy-3α,5α-cycloandrostane and the 6β-amino-17β-carboxy-3α,5α-cycloandrostane. The new compounds show valuable growth-regulating activity and, in some cases, have in addition thereto anabolic activity in warm-blooded animals, without exhibiting the classical hormonal effects of androgens. The compounds of the present invention can be made by heating, in a closed container, a 17β-carboalkoxyandrost-5-ene or a 17β-carboxyandrost-5-ene carrying a loweralkylsulfonoxy or an arylsulfonoxy substituent in the 3β-position, with ammonia, a primary or a secondary loweralkyl amine. A temperature of at least 75° C. for a period of at least 1 hour should be maintained for the above reaction. The preferred temperature range for the reaction is between 75° and 160° C. and the heating period should be extended preferably for a period between 1 and 30 hours. Usually, at the lower temperatures within the above range, heating for a longer period of time is indicated to obtain a sufficient yield, while at the higher temperatures within the above range, a heating period of 1 to 3 hours is sufficient to obtain satisfactory yields.

As indicated above, the starting materials for the process of the present invention are the derivatives of 3β-hydroxy-17β-carboxyandrost-5-ene or the corresponding loweralkyl esters which are esterified in the 3-position with an aryl or loweralkylsulfonic acid, e.g., the methanesulfonoxy-, benzenesulfonoxy- and toluenesulfonoxy-derivatives of the above androstenes. The reaction between the desired amines and the above 3-sulfonoxy ester of androstene - 17 - carboxylic acid (or ester) can be carried out in the presence or absence of a solvent. If a solvent is used, an inert organic liquid with a relatively low vapor-pressure is preferred. The term "inert" signifies that the organic liquid does not react with either reactant or the product formed. The excess of ammonia or amine is removed by distillation, the by-product sulfonic acid salt is dissolved in water, and the desired androstane product is extracted with ether or other organic solvent. The extract is washed with water and concentrated. The crude product is purified by crystallization and/or chromatography on activated magnesium silicate.

In order to illustrate the process of the present invention, reference is made to the following examples which are not meant to limit the invention in any way. In these examples, wherever reference is made to a mixture of solvents and no ratio of such solvents is given, it is to be understood that the first named solvent is used to dissolve the material to make a concentrated solution, and the second solvent is then added to induce or complete crystallization.

EXAMPLE 1

6β-amino-17β-carbomethoxy-3α,5α-cycloandrostane

A mixture of 1.96 grams of 3β-p-toluenesulfonoxy-17β-carbomethoxyandrost-5-ene and 50 ml. of liquid ammonia is heated to 100° C. in a stainless steel bomb for 15 hours. At the end of this period, the ammonia is evaporated and the product is washed from the bomb with alternate portions of ethyl ether and 5% sodium hydroxide. The ether is separated, washed with water, dried with anhydrous magnesium sulfate, and evaporated, leaving 1.25 grams of crude 6β-amino-17β-carbomethoxy-3α,5α-cycloandrostane. Purification of this compound is accomplished by absorbing a 20-ml. benzene solution thereof onto a column containing 120 grams of magnesium silicate activated as described in U.S. 2,393,625 (marketed as Florisil®) from which it is eluted first with benzene followed by gradient elution with benzene/methanol. The major consecutive fractions are combined and evaporated to leave 700 mg. of the above compound. Crystallization from methanol-water produces the pure compound melting at 112–113.5° C. The analytical values obtained for this compound are in agreement with those calculated for the compound of empirical formula $C_{21}H_{33}NO_2$.

EXAMPLE 2

6β-amino-17β-carboxy-3α,5α-cycloandrostane

To a solution of 700 mg. of 6β-amino-17β-carbomethoxy-3α,5α-cycloandrostane in 40 ml. of methanol is added 10 ml. of water containing 1.6 grams of potassium hydroxide. The mixture is refluxed for 3 hours and then cooled and acidified with 4 N hydrochloric acid. A small precipitate is removed by filtration and the filtrate is neutralized with dilute, aqueous sodium hydroxide. Continuous extraction with ethyl ether and evaporation of the ether gives 425 mg. of crude 6β-amino-17β-carboxy-3α,5α-cycloandrostane. This material is crystallized from isopropyl-alcohol to give 380 mg. of the pure product melting at 236–237° C. The analytical values found for this material are in close agreement with those calculated for the formula $C_{20}H_{31}NO_2$.

EXAMPLE 3

6β-acetamido-17β-carbomethoxy-3α,5α-cycloandrostane

To a solution of 331 mg. of 6β-amino-17β-carbomethoxy-3α,5α-cycloandrostane in 10 ml. of pyridine is added 8.4 ml. of acetic anhydride and the mixture is allowed to stand at 25° C. overnight. The reaction mixture is then poured onto ice and the product extracted with ether. The ether extracts are washed with 1.0 N hydrochloric acid, 1.0 N potassium hydroxide, and finally with water. The ether is dried with anhydrous magnesium sulfate and evaporated, giving 372 mg. of crude 6β-acetamido-17β-carbomethoxy-3α,5α-cycloandrostane. Crystallization from hexane gives prisms melting at 145–146.5° C. after drying at 60°/0.5 mm. The analytical values found for this compound are in close agreement for those calculated for the compound of empirical formula $C_{23}H_{35}NO_3$.

EXAMPLE 4

*6β-acetamido-17β-carboxy-3α,5α-cycloandrostane*

To a solution of 120 mg. of 6β-amino-17β-carboxy-3α,5α-cycloandrostane in 6.0 ml. of pyridine is added 4.0 ml. of acetic anhydride and the mixture is allowed to stand overnight at 27° C. The reaction mixture is then diluted with 20 ml. of water, acidified with 6 N hydrochloric acid and the product is extracted with chloroform. The extract is washed with 6 N hydrochloric acid and water, dried over magnesium sulfate and evaporated, to produce 133 mg. of crude 6β-acetamide-17β-carboxy-3α,5α-cycloandrostane which is crystallized from benzene/hexane to yield 106 mg. of the pure product melting at 258–260° C. in a sealed evacuated capillary. The analytical values found are in close agreement with those calculated for the formula $C_{22}H_{33}NO_3$.

EXAMPLE 5

*6β-(N,N-dimethylamino)-17β-carbomethoxy-3α,5α-cycloandrostane*

A mixture of 1.5 grams of 3β-p-toluenesulfonoxy-17β-carbomethoxy-5-androstene and 60 ml. of dimethylamine is heated to 100° in a stainless steel bomb for 15 hours. The bomb is then cooled and the excess dimethylamine is evaporated. The bomb content is washed alternately with portions of ethyl ether and 12 N ammonium hydroxide. The aqueous phase is separated and the ether layer is washed with 6 N ammonium hydroxide and water. The ether is dried over anhydrous magnesium sulfate and evaporated giving crude 6β-(N,N-dimethylamino)-17β-carbomethoxy-3α,5α-cycloandrostane containing as by-products lesser amounts of 3α- and 3β-(N,N-dimethylamino)-17β-carbomethoxy-5-androstene. The pure compound is obtained by chromatography with a Florisil column and elution with n-pentane containing 0.3% piperidine, followed by crystallization from methanol-water.

When, in the above example, dimethylamine is replaced with ethylamine, 6β-ethylamino-17β-carbomethoxy-3α,5α-cycloandrostane is obtained. The acylation procedure of Example 3 used on this compound produces 6β-(N-ethylacetamido)-17β-carbomethoxy-3α,5α-cycloandrostane.

EXAMPLE 6

*6β-(N,N-dimethylamino)-17β-carboxy-3α,5α-cycloandrostane*

In the manner described in Example 2, 6β-(N,N-dimethylamino)-17β-carbomethoxy-3α,5α-cycloandrostane is converted to 6β-(N,N-dimethylamino)-17-carboxy-3α,5α-cycloandrostane. Crystallization of the crude material from methanol-water gives the pure compound.

As will be seen from the above examples, the above process produces the 6β-amino derivatives of 3α,5α-cycloandrostane-17-carboxylic acid or the corresponding loweralkyl esters. The amino group can be substituted by replacing the ammonia used in the reaction of Example 1 with the equivalent amount of an amine of the formula RNHR' wherein R and R' can be the same or different loweralkyl substituents. The corresponding mono-substituted amines can be made in the same fashion by using an amine of the formula $RNH_2$ wherein R is a loweralkyl substituent. The mono-substituted amino compounds can also be made from the unsubstituted amino compounds by first making a Schiff base with the appropriate loweralkyl aldehyde and subsequent reduction of the Schiff base with hydrogen and Raney nickel as the catalyst.

Although the above examples demonstrate the process using a carbomethoxy substituent at the 17-position of the starting material, other loweralkyl esters or the free carboxylic acid can be used equally well. It will be apparent that any given 17-carbalkoxy derivatives can be converted first into the free 17-carboxylic derivatives from which another alkyl ester of the free acid can be obtained by known ways.

The starting materials used in the process of the present invention are prepared from the known hydroxy acids and esters by reaction with an aryl-(or alkyl-) sulfonyl chloride in pyridine solution, for example as described in Helv. Chim. Acta, volume 26, page 2272 (1943). The various hydroxy acids and esters are described in the above reference and in Chem. Berichte 68, 1814 (1935); Helv. Chim. Acta, 20, 949 (1937); 23, 658 (1940); 29, 718 (1946); 30, 1976 (1947); and 46, 392 (1963).

Others may prcatice the invention in any of the numerous ways which will be suggested to one skilled in the art by the present disclosure. All such practice of the invention is considered a part hereof provided it falls within the scope of the appended claims.

We claim:
1. A steroid of the formula

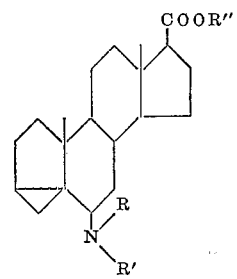

wherein R and R" are both selected from the group consisting of hydrogen and A, and wherein R' is selected from the group consisting of hydrogen, A, and ACO, wherein A stands for loweralkyl.

2. 6β-amino-17β-carbomethoxy-3α,5α-cycloandrostane.
3. 6β-amino,17β-carboxy-3α,5α-cycloandrostane.
4. 6β-acetamido-17β-carbomethoxy-3α,5α-cycloandrostane.
5. 6β-acetamido-17β-carboxy-3α,5α-cycloandrostane.
6. 6β-(N,N-dimethylamino)-17β-carbomethoxy-3α,5α-cycloandrostane.
7. 6β-(N,N-dimethylamino)-17β-carboxy-3α,5α-cycloandrostane.

References Cited

Tadanier et al., Jour. Org. Chem., vol. 27, pages 4624–4633 (1962).

LEWIS GOTTS, *Primary Examiner.*

HENRY A. FRENCH, *Assistant Examiner.*